United States Patent
Wang

(10) Patent No.: US 10,632,489 B1
(45) Date of Patent: Apr. 28, 2020

(54) STICKING ELIMINATION METHOD FOR AND STRUCTURE OF THE WATER CONTROL VALVE OF A WATER SPRAYING TIMER

(71) Applicant: Cheng-Yu Wang, Lugu Township, Nantou County (TW)

(72) Inventor: Cheng-Yu Wang, Lugu Township, Nantou County (TW)

( * ) Notice: Subject to any disclaimer, the term of this patent is extended or adjusted under 35 U.S.C. 154(b) by 48 days.

(21) Appl. No.: 16/184,546

(22) Filed: Nov. 8, 2018

(51) Int. Cl.
*B05B 15/52* (2018.01)
*B05B 15/14* (2018.01)
*F16K 29/00* (2006.01)
*F16K 37/00* (2006.01)
*F16K 31/53* (2006.01)
*F16K 31/04* (2006.01)

(52) U.S. Cl.
CPC .............. *B05B 15/52* (2018.02); *B05B 15/14* (2018.02); *F16K 29/00* (2013.01); *F16K 31/043* (2013.01); *F16K 31/535* (2013.01); *F16K 37/0041* (2013.01); *F16K 37/0083* (2013.01)

(58) Field of Classification Search
CPC ....... B05B 15/52; B05B 15/14; F16K 31/535; F16K 37/0083; F16K 37/0041; F16K 29/00; F16K 31/043
See application file for complete search history.

(56) References Cited

U.S. PATENT DOCUMENTS

| | | | | |
|---|---|---|---|---|
| 4,554,788 | A * | 11/1985 | Hwang | F01D 17/26 60/646 |
| 2005/0199842 | A1* | 9/2005 | Parsons | E03D 3/02 251/129.04 |
| 2017/0314512 | A1* | 11/2017 | Dudar | F02M 25/0827 |
| 2017/0362993 | A1* | 12/2017 | Seo | F01P 11/14 |

\* cited by examiner

*Primary Examiner* — Kenneth M Lo
*Assistant Examiner* — Istiaque Ahmed
(74) *Attorney, Agent, or Firm* — Egbert Law Offices, PLLC

(57) ABSTRACT

A sticking elimination method and structure for the water control valve of a water spraying timer. The methodology includes: open/closed state sensing step: detect the open/closed mode of the water control valve and generate and send a signal to the electronically controlled processing unit; stuck state judging step: the detecting and computing module of the processing unit judges if the state of the component has gone beyond the preset abnormal value; reverse control step: if a stuck state is judged, the valve is driven to reverse; reverse state sensing step: detect if the valve has successfully reversed and returned to the open/closed mode; repeated reverse step: if the stuck state is not eliminated, repeat the reverse till set times; automatic shutdown step: if the reverse times reach the set times and it is judged that the valve is still in the stuck state, shut down the water spraying timer.

8 Claims, 11 Drawing Sheets

STICKING ELIMINATION METHOD FOR AND STRUCTURE OF THE WATER CONTROL VALVE OF A WATER SPRAYING TIMER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a water spraying timer and more particularly to the technical disclosure of an innovative flow channel sticking elimination method for and structure of a water spraying timer.

2. Description of Related Art Including Information Disclosed Under 37 CFR 1.97 and 37 CFR 1.98

The water spraying timer referred to in the present invention is a control device widely installed and applied in various environments requiring water spraying for irrigation or cooling, such as a garden, a golf course, a park, or a tin roof.

The function of a water spraying timer is to control the frequency of water spraying of a specific water-spraying device and the time of spraying each time. Accordingly, its structural design mainly offers a setting interface for a user to operate, and a microprocessor which can drive a motor and a gearbox according to the set value of the aforesaid setting interface, so as to subsequently control the opening and closing of a water control valve for the function of timed spraying.

However, according to our survey, in actual applications, the structure of the prior-art water spraying timer still has the following problems and shortcomings. During the turning to open or close the aforesaid water control valve, due to accumulation of mud, small stones, dirt, or foreign objects, there will be situations when the water control valve gets stuck before turning to the fully open or fully closed position. And, when such a situation happens, more often than not, the management personnel are not on site and cannot observe and respond immediately, resulting in overload, overheating, or damage of the motor of the water spraying timer, or excessive friction of the water-stopping ring, which may lead to leakage, sticking or damage of the water control valve. Thus, the prior-art water spraying timer has a reduced lifecycle and is not durable.

BRIEF SUMMARY OF THE INVENTION

The main objective of the present invention is to provide a flow channel sticking elimination method and structure of the water spraying timer. The technical solution is to develop an ideal and more practical new water spraying timer incorporating a flow channel sticking elimination technique; said water spraying timer comprises a power supply unit, a water control valve having an open mode and a closed mode, and operating in the form of rotation, a driving motor, a gearbox to connect the driving motor with the water control valve, a setting interface and an electronically controlled processing unit.

Based on the above objective, the technical feature of the present invention to solve the aforesaid problem is that the water control valve sticking elimination method includes the following steps: (A) an open/closed state sensing step: to detect and sense if the water control valve is in the open mode or in the closed mode, and to generate an open mode signal or a closed mode signal and send the signal to the electronically controlled processing unit; (B) a stuck state judging step: through the built-in detecting and computing module of the electronically controlled processing unit, judge if the flow channel of the water control valve is in the stuck state via either of the following detecting modes: detect if the operating electric currency of the driving motor has gone beyond the set abnormal currency value; detect if the time interval between the open mode signal and the closed mode signal generated in the open/closed state sensing step has gone beyond the set abnormal time value; (C) a reverse control step: once the stuck state judging step judges that a stuck state of the water control valve flow channel, the electronically controlled processing unit will order the driving motor for a counter-rotation, so that the water control valve will synchronously reverse; (D) a reverse state sensing step: via the detecting and computing module, once again detect and sense if the water control valve has successfully reversed and returned to the closed mode or open mode, if yes, judge that the stuck state is eliminated, otherwise, judge that the stuck state is not eliminated; (E) a repeated reverse step: once the reverse state sensing step judges that the stuck state of the water control valve is not eliminated, repeat the previous Steps (C) to (D) until set repetition times; (F) an automatic shutdown step: when the repeated reverse of the water control valve in the previous Step (E) reaches the set repetition times, and the detecting and computing module still judges that the water control valve is in the stuck state, the electronically controlled processing unit shuts down the water spraying timer and the operation is stopped.

Another objective of the present invention is to provide a water control valve sticking elimination structure, which comprises: an open/closed state sensing component, including an open state sensor and a closed state sensor, respectively used to detect and sense if the water control valve is in the opening mode or in the closed mode, and to generate an open mode signal or a closed mode signal and send the signal to the electronically controlled processing unit; a detecting and computing module, built inside the electronically controlled processing unit, to detect and judge if the water control valve is in the stuck state; when it is judged that the water control valve is in the stuck state, the detecting and computing module will order the driving motor to rotate inversely, so that the water control valve will simultaneously rotate inversely; and the detecting and computing module will again detect and sense if the water control valve has successfully rotated to the closed mode or the open mode. If yes, it will judge that the stuck state is eliminated; if not, it will judge that the stuck state is not eliminated, and will further order the driving motor to continue rotating inversely till the set repetition times are reached; if the repetition times are reached, and the detecting and computing module still judges that the water control valve is in the stuck state, the electronically controlled processing unit will shut down the water spraying timer and the operation is stopped.

The beneficial effect and advantage of the present invention mainly lies in the technical feature of reverse control. When the water control valve of the water spraying timer gets stuck, it will automatically rotate inversely, so that the mud, small stones, dirt, or foreign objects causing the sticking will move toward the loose side to avoid increasingly tightened sticking of the mud, small stones, dirt, or foreign objects. Moreover, when the stuck state cannot be eliminated, the water spraying timer will be automatically shut down, so as to avoid fatal damage of the water control valve. Thus, the quality and durability of the water spraying timer is greatly enhanced. This constitutes a practical advancement of the present invention.

A further objective of the present invention is to realize a function of executing an alarming action when the electronically controlled processing unit has shut down the water spraying timer. The alarming action can be realized through any of a flashing light, a buzzer to emit a warning sound, or a wireless signal transmission to a remote management device; through this technical feature, the water spraying timer management personnel will be notified of the shutdown state in real time, so that they can respond immediately to carry out a repair.

DETAILED DESCRIPTION OF THE INVENTION

Figure 1:
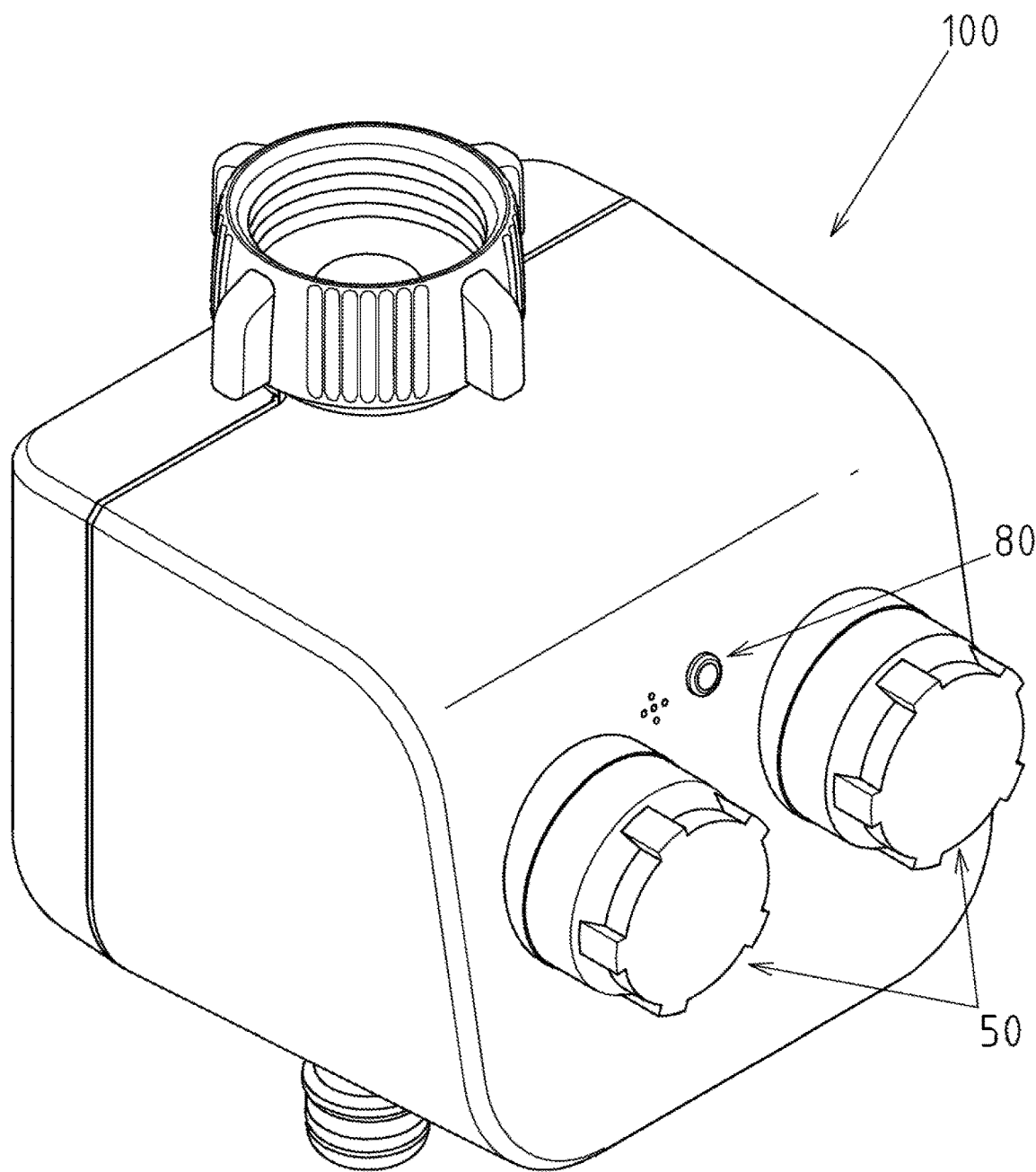
FIG. 1 is a combined external view of a preferred embodiment of the water spraying timer of the present invention.
Figure 2:
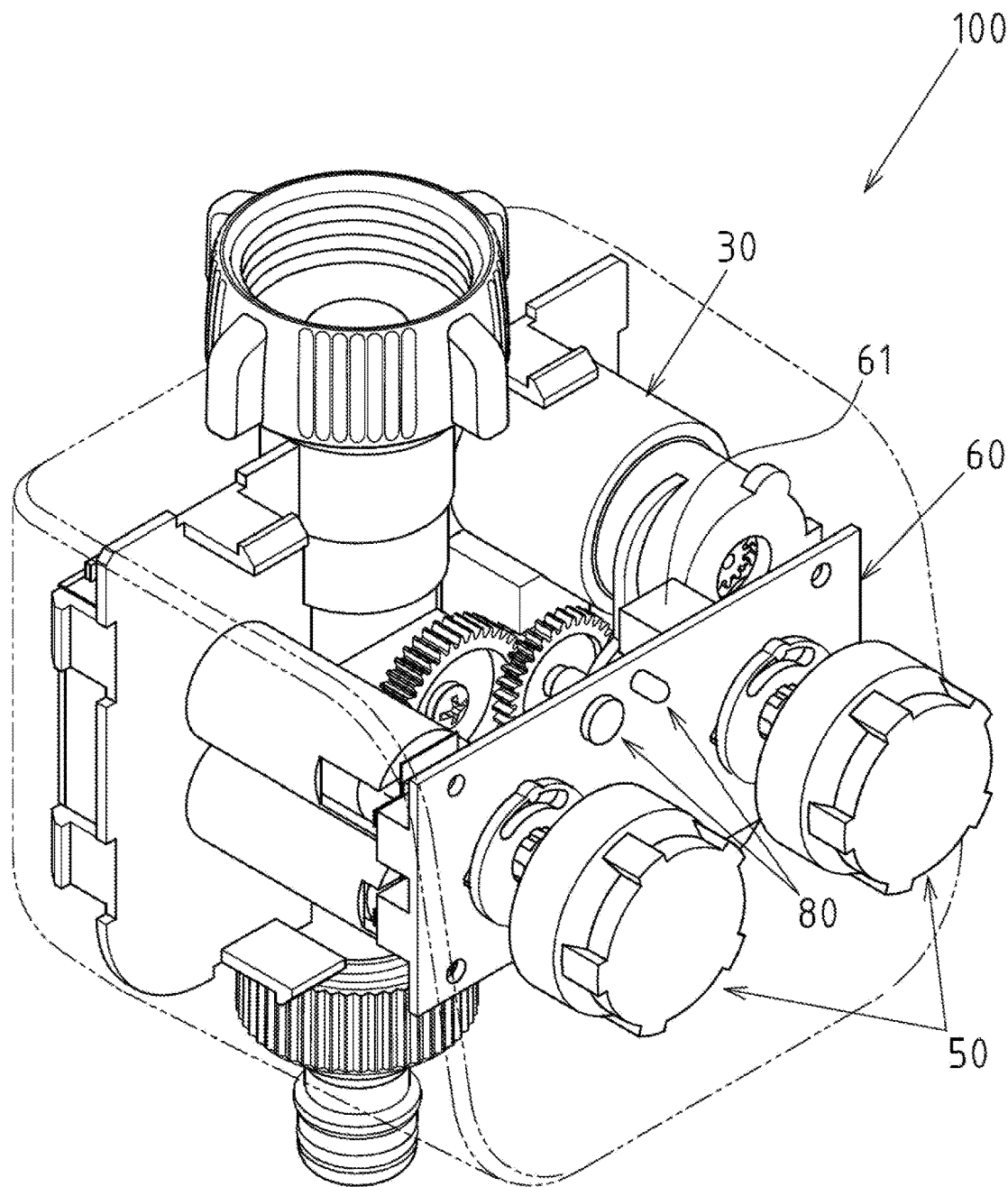
FIG. 2 is a perspective view of the internal structure of a preferred embodiment of the water spraying timer of the present invention.

Referring to FIGS. 1 to 4, a preferred embodiment of the sticking elimination method and structure of the water control valve of a water spraying timer is disclosed. However, it is to be understood that such an embodiment is illustrative only and is not intending to limit the scope of the invention in any manner.

Said water spraying timer 100 comprises a power supply unit 10, a water control valve having an open mode and a closed mode and operating in the form of rotation 20, a driving motor 30, a gearbox 40 to connect the driving motor 30 with the water control valve 20, a setting interface 50, and an electronically controlled processing unit 60 (can be, but not limited to, a circuit board) electrically connected to the setting interface 50 and the driving motor 30.

Figure 5:
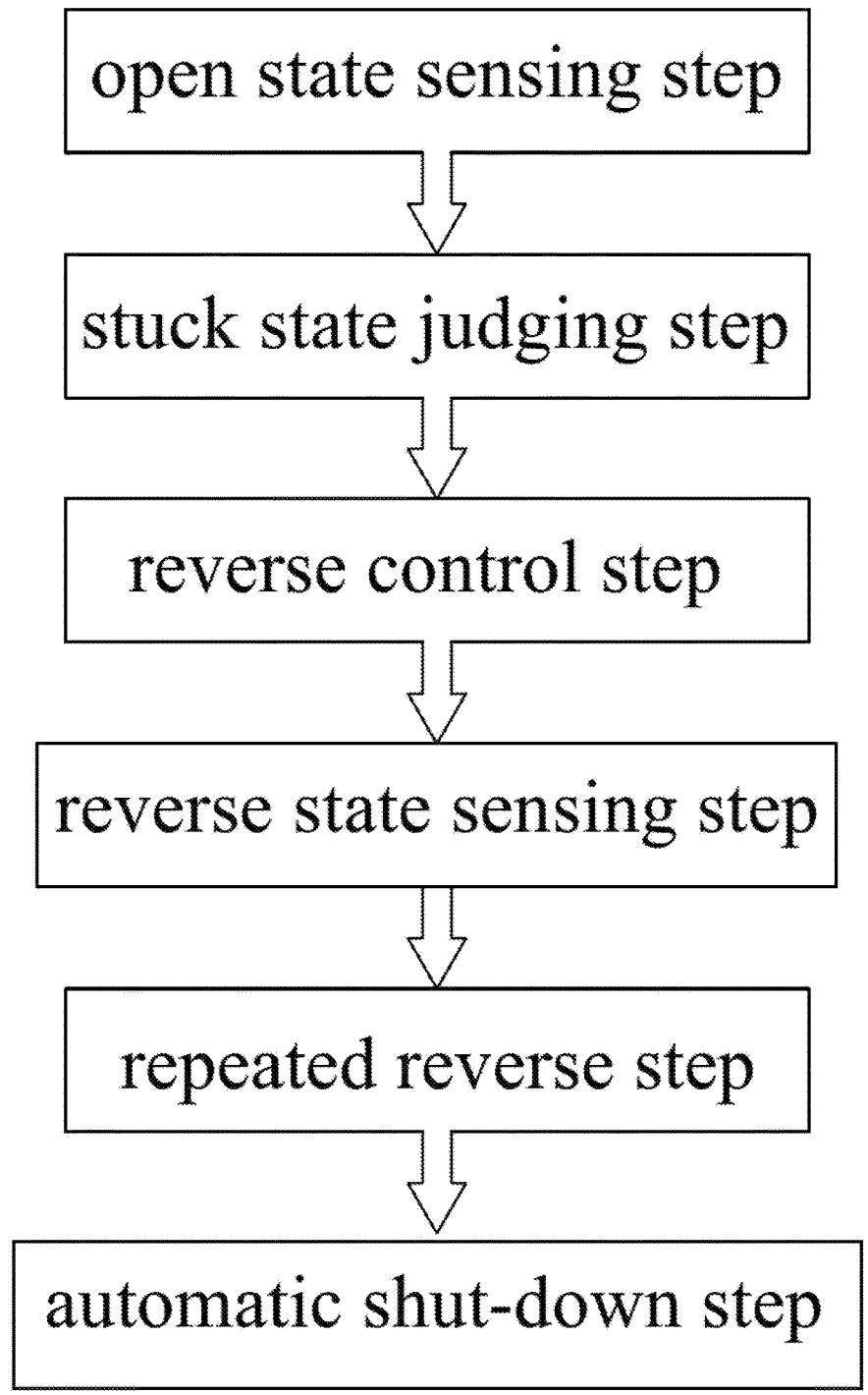
FIG. 5 is a text block chart of the methodological steps of the present invention.

Further referring to FIG. 5, said water control valve sticking elimination method comprises the following steps:
  (A) an open/closed state sensing step: used to detect and sense if the water control valve 20 is in the open mode or in the closed mode, and generate an open mode signal or a closed mode signal to the electronically controlled processing unit 60;
  (B) a stuck state judging step: the electronically controlled processing unit 60 has a built-in detecting and computing module 61, which, via either of the following detecting mode, judges if the flow channel of the water control valve 20 is in the stuck state: one, detect if the operating electric current of the driving motor 30 has gone beyond the set abnormal currency value (e.g., 2 times that of the normal currency value); two, detect if the time interval between the open mode signal and closed mode signal generated in the open/closed state sensing step has gone beyond the set abnormal value (e.g., 3 seconds);
  (C) a reverse control step: when the stuck state judging step judges that the flow channel of the water control valve 20 is in the stuck state, the electronically controlled processing unit 60 will order the driving motor 30 to rotate inversely, so that the water control valve 20 will simultaneously rotate inversely;
  (D) a reverse state sensing step: the detecting and computing module 61 will again detect if the water control valve 20 has successfully reversed and returned to the open mode or the closed mode. If yes, it is judged that the stuck state is eliminated; if not, it is judged that the stuck state is not eliminated;
  (E) a repeated reverse step: when the reverse state sensing step judges that the stuck state of the water control valve 20 is still not eliminated, the previous Steps (C) to (D) will be repeated till set repetition times (e.g., preferably from 3 to 5 times);
  (F) an automatic shutdown step: when, in the previous Step (E), the water control valve 20 has executed reverses till set repetition times, and the detecting and computing module 61 still judges that the water control valve 20 is in the stuck state, the electronically controlled processing unit 60 will shut down the water spraying timer 100 and the operation is stopped.

In particular, in the open/closed state sensing step, the method to detect and sense the mode of the water control valve 20 is realized through configuration of a sensor (detailed structure is described later).

In particular, in the automatic shutdown step, when the electronically controlled processing unit 60 shuts down the water spraying timer 100 and the operation is stopped, it will meanwhile execute a alarming action. The alarming action is realized through any of the following forms: a flashing light, a buzzer to emit a warning sound, a wireless signal transmission to a remote management device.

Figure 6:
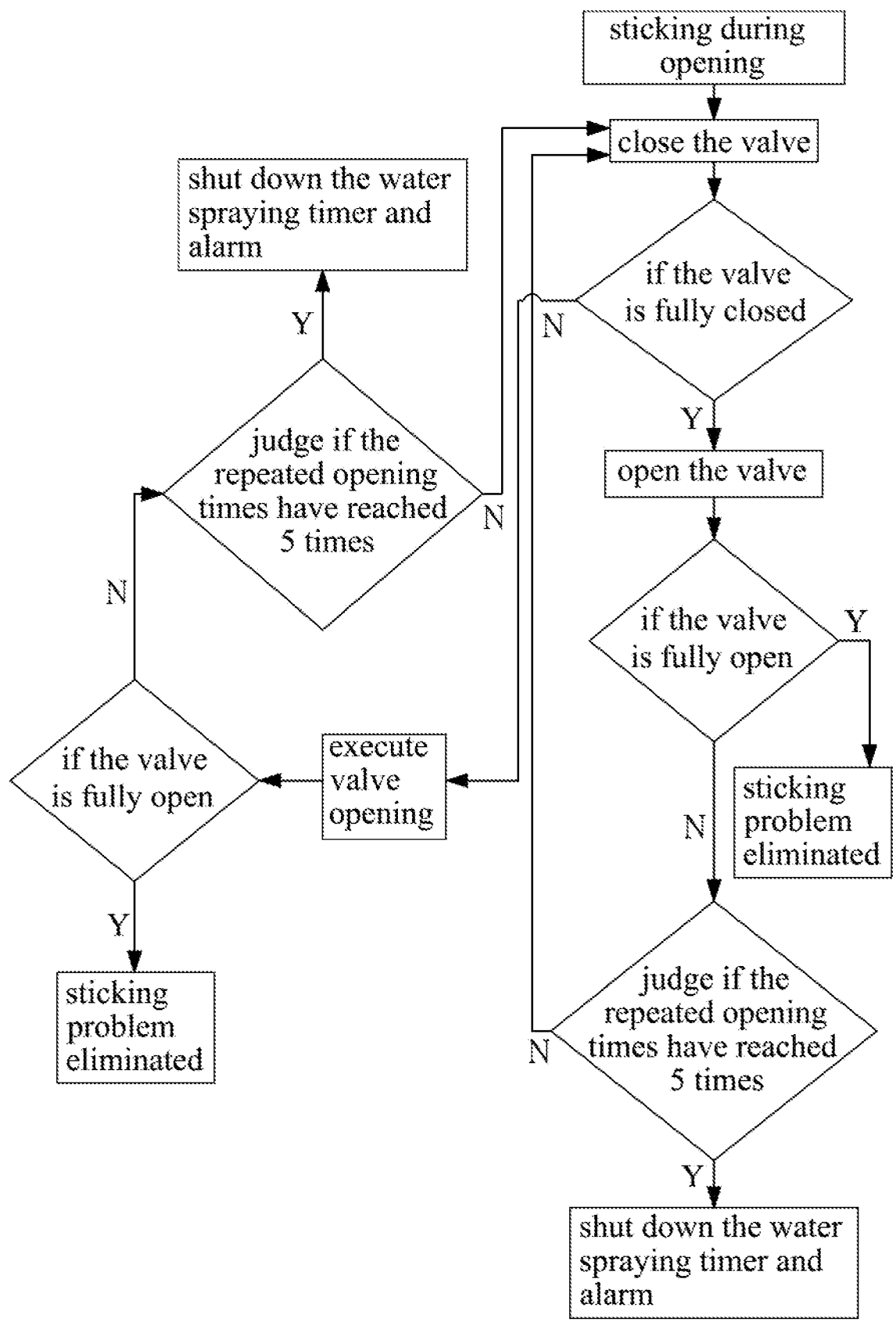
FIG. 6 is a text block chart of the operational state when the water control valve of the present invention gets stuck during the opening process.
Figure 7:
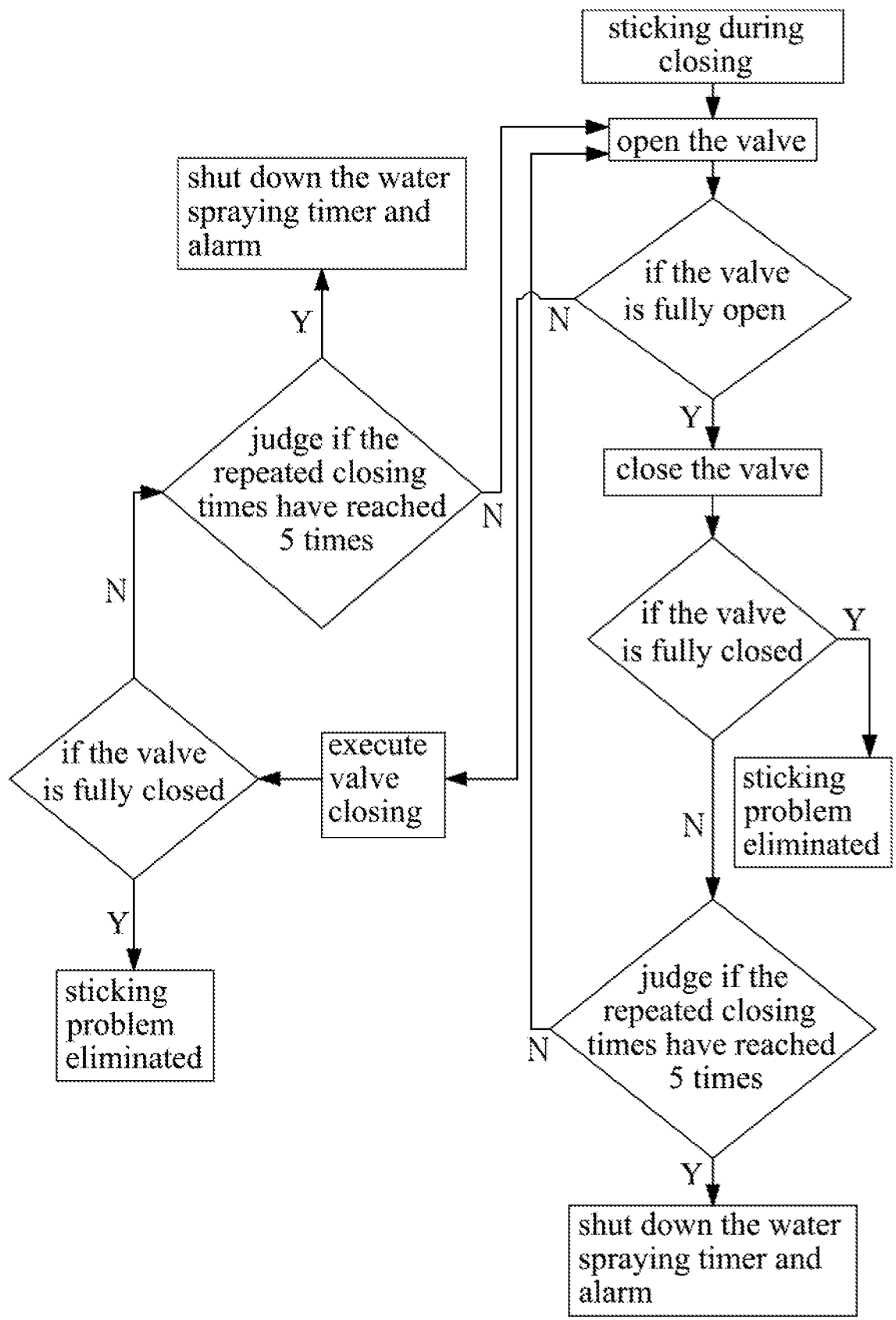
FIG. 7 is a text block chart of the operational state when the water control valve of the present invention gets stuck during the closing process.

In the above water control valve sticking elimination method, the steps executed when the water control valve gets stuck during the opening or closing process are further detailed below. Firstly, referring to FIG. 6, when the water control valve gets stuck during the opening process, a reverse to close the valve will be firstly executed. If the reverse to close the valve can be successfully executed and the valve is returned to the fully closed state, then the valve is opened again, and it is judged if the valve can be fully opened. If yes, it is judged that the sticking is eliminated. On the contrary, if the above reverse action to close the valve is judged to be unsuccessful and the valve is not returned to the fully closed state, a reverse to open the valve will be executed. If it is judged that the repetition times to open the valve has reached 5 times and the sticking is still not eliminated, the water spraying timer will be shut down and a warning is sent to avoid damage of the water control valve due to excessive friction by the mud, small stones, dirt or foreign objects; otherwise, if the water control valve gets stuck during the closing process, the detailed responding actions are shown in FIG. 7, with the only difference from FIG. 6 being the exchange of the valve opening and closing actions, and are therefore not detailed here.

Furthermore, regarding the structure of the invention, said water control valve sticking elimination structure comprises: an open/closed state sensing component 70, including a open state sensor 71 and a closed state sensor 72, respectively used to detect and sense if the water control valve 20 is in the open mode or in the closed mode, and to generate an open mode signal or a closed mode signal and send the signal to the electronically controlled processing unit 60; a detecting and computing module 61, built inside the electronically controlled processing unit 60, to detect and judge if the water control valve 20 is in the stuck state; in particular, when it is judged that the water control valve 20 is in the stuck state, the detecting and computing module 61 will order the driving motor 30 to rotate inversely, so that the water control valve 20 will simultaneously rotate inversely; and the detecting and computing module 61 will again detect if the water control valve 20 has successfully reversed and returned to the open mode or the closed mode. If yes, it is judged that the stuck state is eliminated; if not, it is judged that the stuck state is not eliminated, and the driving motor 30 will be ordered to reverse continuously till the set repetition times; if reverses are executed till the set repetitions times, and the detecting and computing module 61 still judges that the water control valve 20 is in the stuck state, then the electronically controlled processing unit 60 will shut down the water spraying timer 100 and the operation is stopped.

Figure 3:
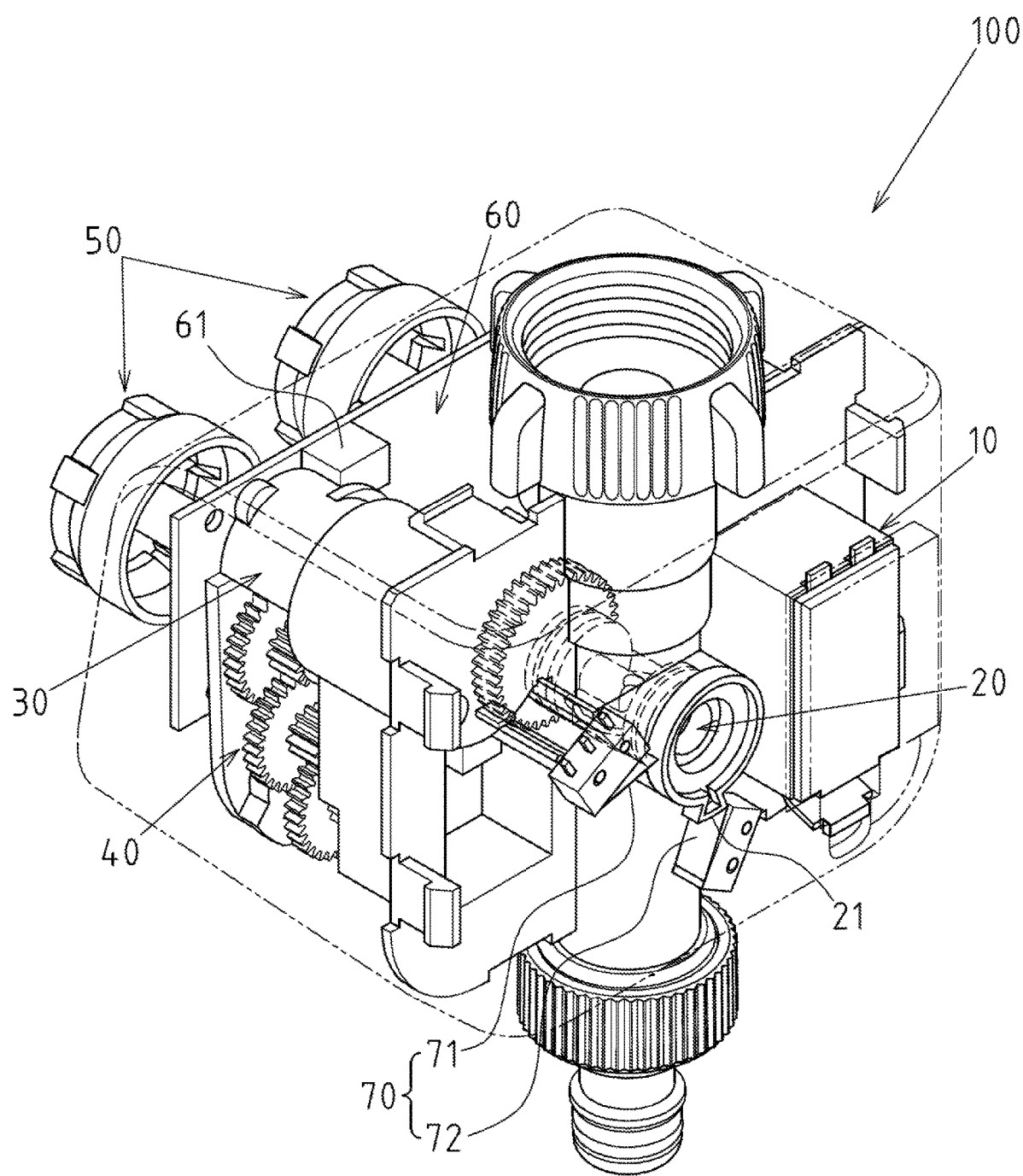
FIG. 3 is a perspective view of the internal structure of a preferred embodiment of the water spraying timer of the present invention from another angle.
Figure 4:
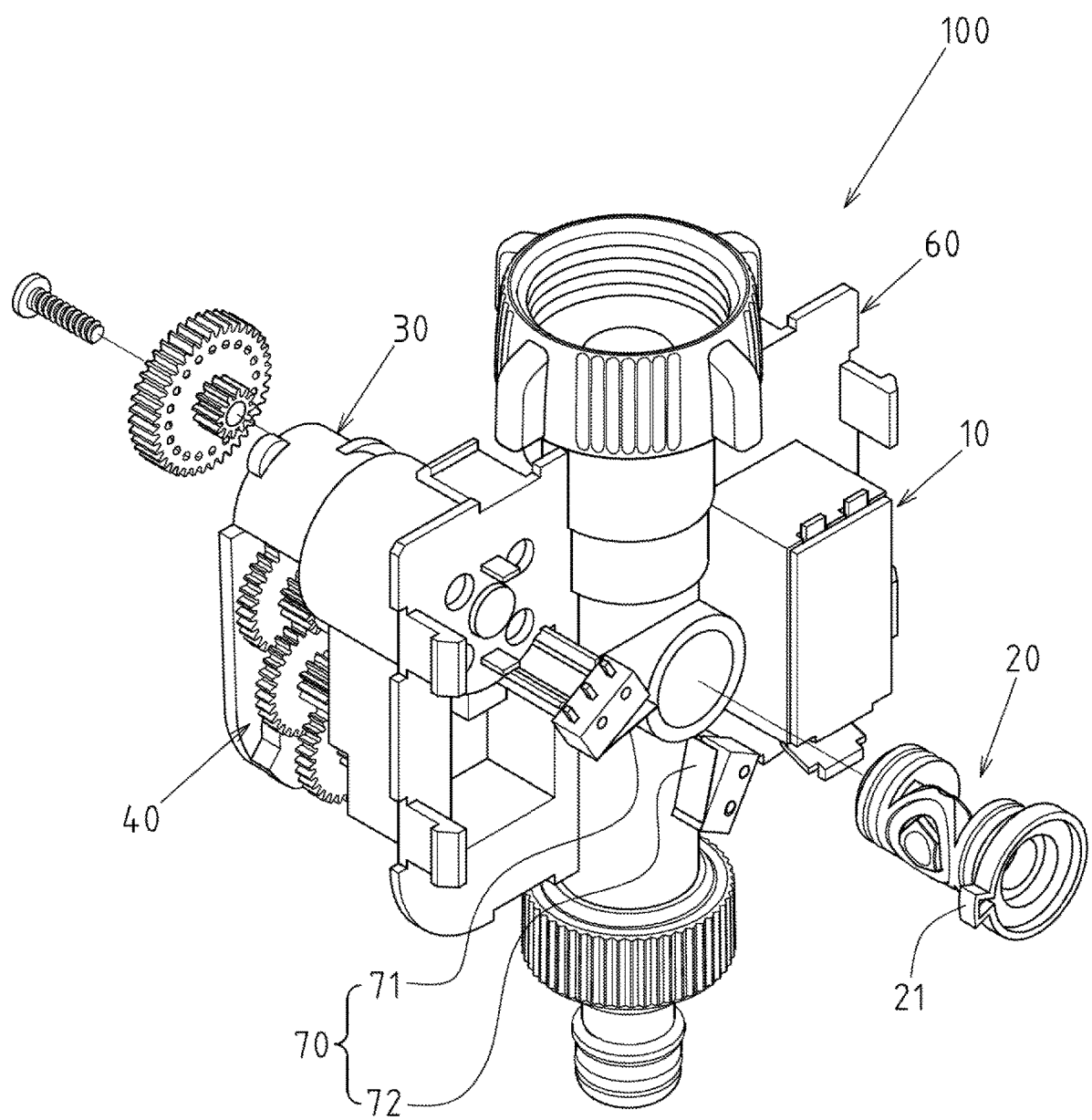
FIG. 4 is an exploded perspective view of partial components of a preferred embodiment of the water spraying timer of the present invention.
Figure 8:
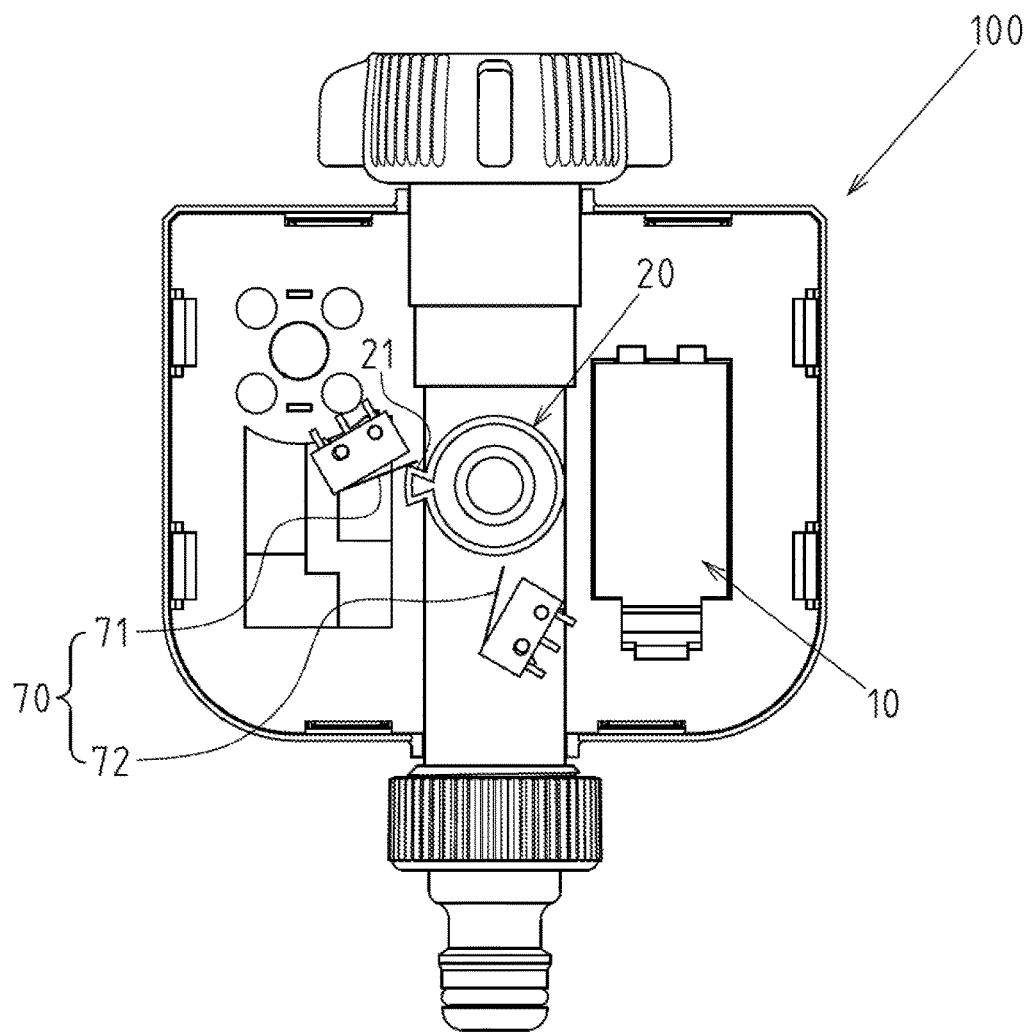
FIG. 8 is a corresponding state diagram of the open/closed state sensing component when the water control valve of the present invention is in the open mode.
Figure 9:
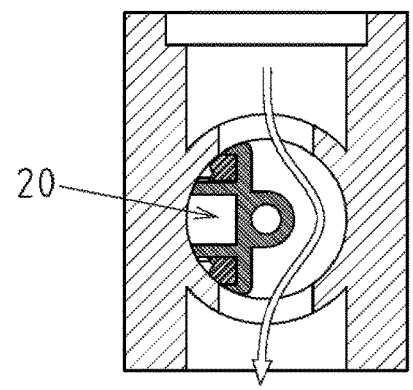
FIG. 9 is a sectional view of the opening state of the internal flow channel of the water control valve during the state mentioned in FIG. 8.
Figure 10:
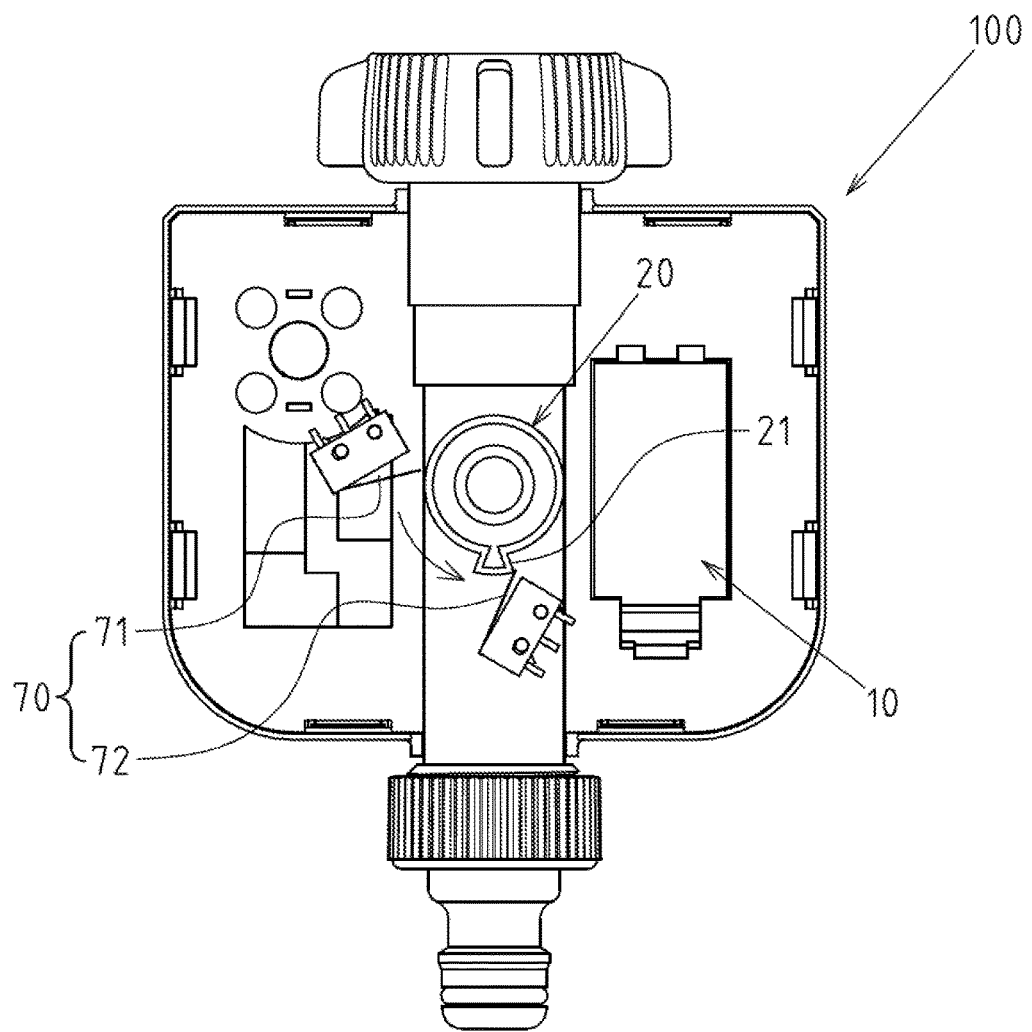
FIG. 10 is a corresponding state diagram of the open/closed state sensing component when the water control valve of the present invention is in the closed mode.
Figure 11:
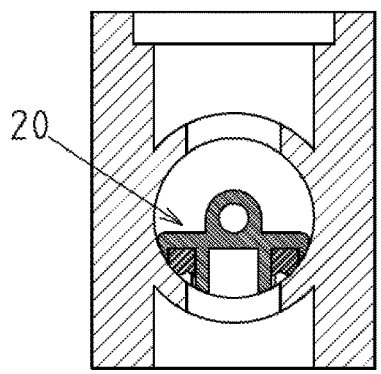
FIG. 11 is a sectional view of the closing state of the internal flow channel of the water control valve during the state mentioned in FIG. 10.

Referring to FIGS. 3 and 4, in the present embodiment, one end of the water control valve 20 is configured with a flange 21. The flange 21 has a first corner position (see FIG. 8) and a second corner position (see FIG. 10), which, along with the rotation of the water control valve 20, respectively correspond to the open mode and closed mode of the water control valve 20. The open state sensor 71 and closed state sensor 72 of the open/closed state sensing component 70 are in the form of micro switches, and the open state sensor 71 is configured at a place corresponding to the first corner position of the flange 21, whereas the closed state sensor 72 is configured at a place corresponding to the second corner position of the flange 21.

In particular, in the structure of the water spraying timer 100, there is a further configuration of an alarming device 80. The alarming device 80 is in any of the following forms: a light, a buzzer, or a wireless signal transmission device. In the present embodiment, the alarming device 80 shown in FIG. 2 has both a light and a buzzer.

Figure 12:
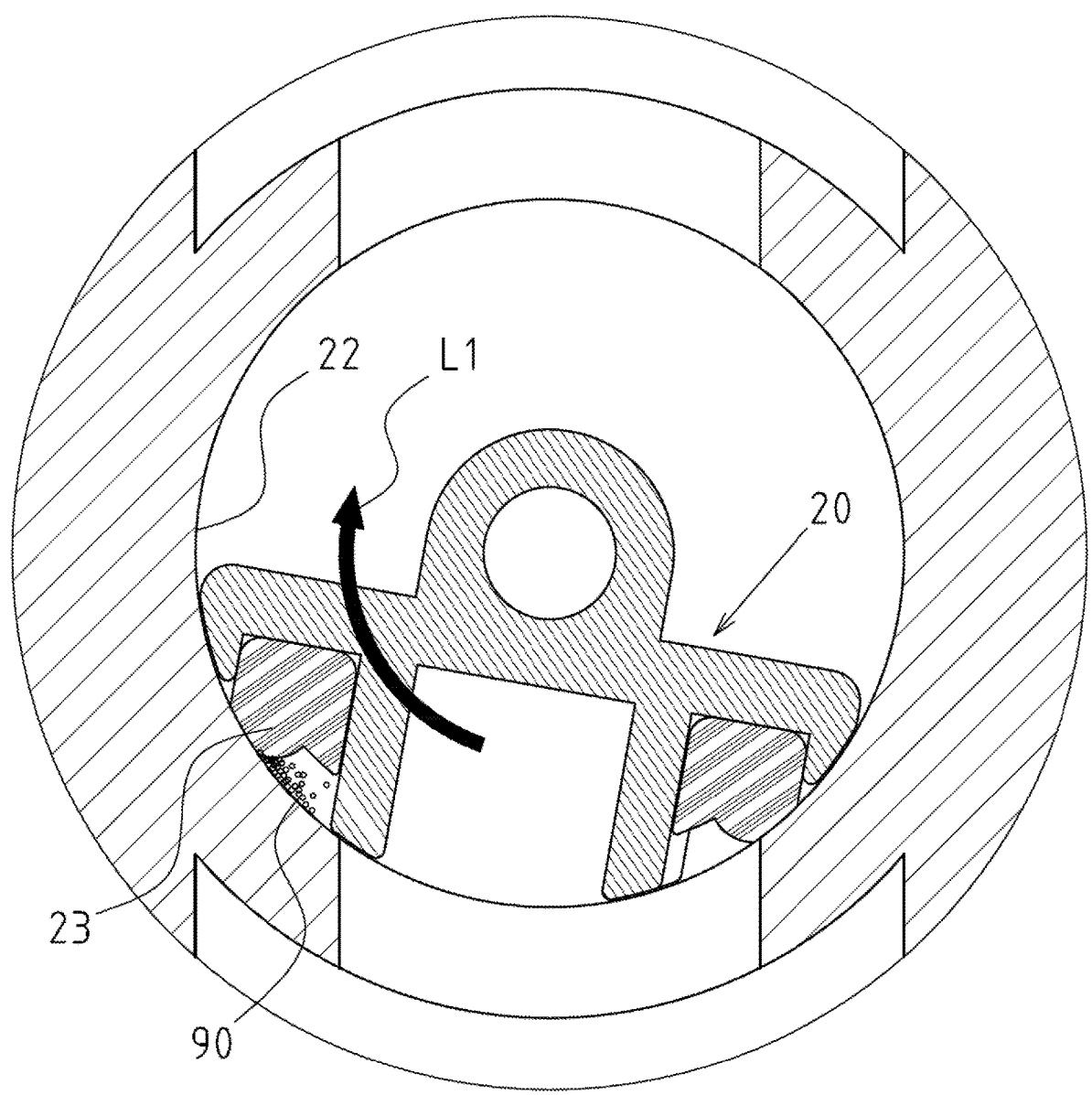
FIG. 12 is a diagrammatic view of the stuck state of the water control valve of the present invention resulting from an obstruction.
Figure 13:
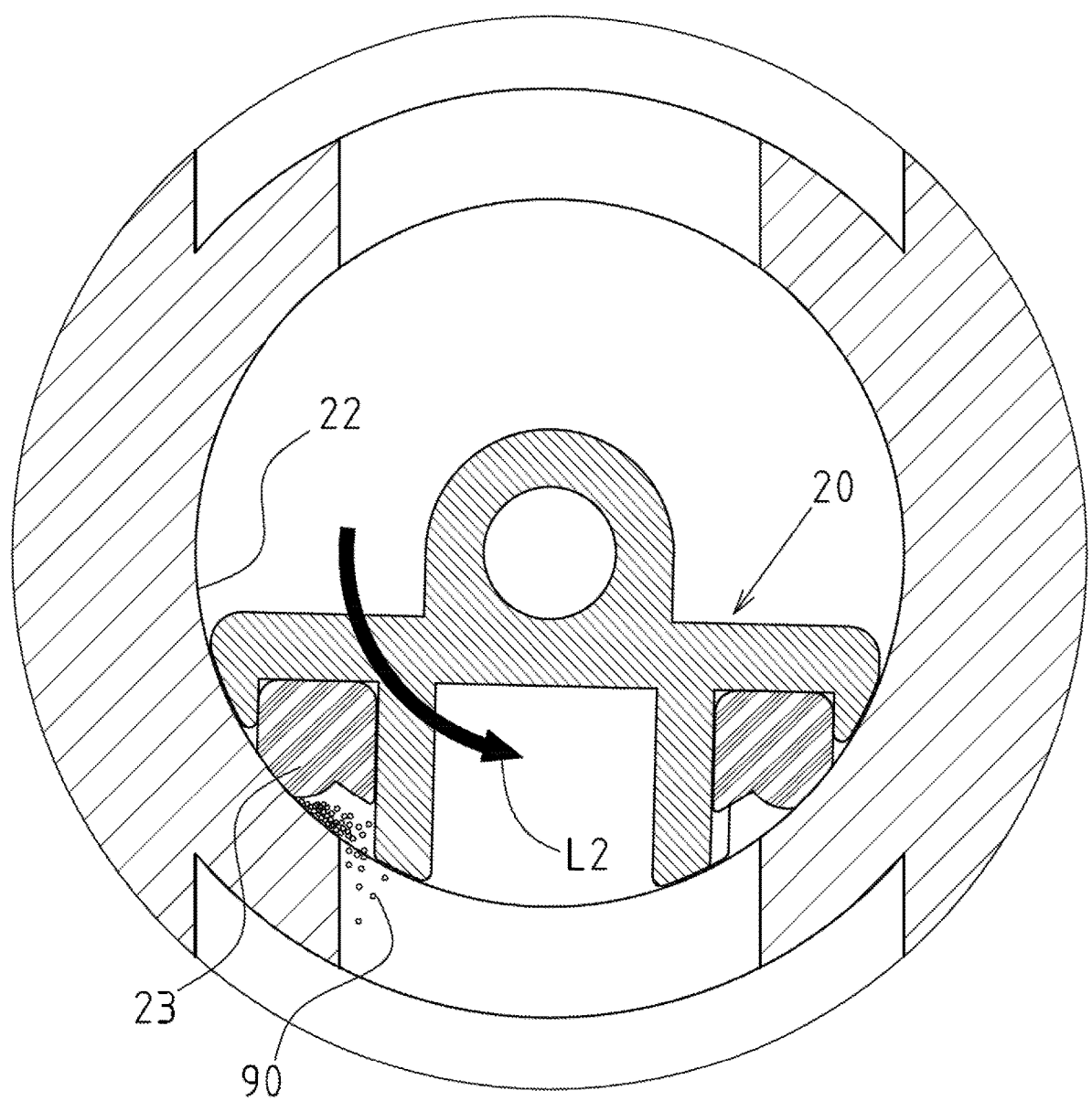
FIG. 13 is a continuation of FIG. 12, being a diagrammatic view of the water control valve reversing to force the obstruction to move toward the loose side.

Based on the technical features of the above-mentioned method and structural design, the sticking elimination method and structure of the water control valve of a water spraying timer as disclosed in the present invention can, through automatic reverse control, force the mud, small stones, dirt or foreign objects to move toward the loose side when the water control valve of the water spraying timer gets stuck. In the present embodiment, as shown in FIG. 12, when the water control valve 20 is rotated clockwise to open (as indicated by Arrow L1), the obstruction 90 (collective name referring to the aforesaid mud, small stones, dirt, or foreign objects) moves toward the rotation direction of water control valve 20 and gets stuck between the periphery of the water control valve 20 and the inner wall of the valve slot 22 due to excessive friction; then, as shown in FIG. 13. When the water control valve 20 rotate inversely counterclockwise (as indicated by Arrow L2), because the aforesaid squeezed obstruction 90 will move toward the loose side, or, even if it does not move, it will not get more and more tightened, and because the flow channel around the water control valve 20 is full of water, the loosened obstruction 90 will have a chance to be dissolved into the water, and the obstruction 90 will not get stuck more and more tightly; moreover, based on the technology of the present invention, when it is detected and judged that the stuck state of the water control valve 20 cannot be eliminated, the water spraying timer 100 will be automatically shut down, so as to avoid fatal damage of the water control valve 20 due to the sticking. Therefore, it is obvious that the present invention can really enhance the quality and durability of the water spraying timer 100; as an additional remark, the reason why the tightened obstruction 90 may cause damage of the water control valve 20 is that the water control valve 20 structure is usually configured with a water-stopping ring 23 (as shown in FIGS. 12 and 13), and if the water-stopping ring 23 suffers from excessive friction by the tightened obstruction 90, it will very likely be damaged, resulting in the loss of watertight status of the water-stopping ring 23.

I claim:

1. A sticking elimination method for a water control valve of a water spraying timer, said water spraying timer including a power supply unit, a water control valve having an open mode and a closed mode and operating in the form of rotation, a driving motor, a gearbox to connect the driving motor with the water control valve, a setting interface and an electronically controlled processing unit electrically connected to the setting interface and the driving motor; said valve sticking elimination method comprising the following steps:
   (A) an open/closed state sensing step: to detect and sense if the water control valve is in the open mode or in the closed mode, and to generate an open mode signal or a closed mode signal and send the signal to the electronically controlled processing unit;

(B) a stuck state judging step: through a built-in detecting and computing module of the electronically controlled processing unit, judge if the flow channel of the water control valve is in a stuck state via either of the following detecting modes: detect if an operating electric current of the driving motor has gone beyond a set abnormal current value; detect if a time interval between the open mode signal and the closed mode signal generated in the open/closed state sensing step has gone beyond a set abnormal time value;

(C) a reverse control step: once the stuck state judging step judges that the water control valve is in the stuck state, the electronically controlled processing unit will order the driving motor to rotate inversely, so that the water control valve will simultaneously rotate inversely;

(D) a reverse state sensing step: via the detecting and computing module, once again detect and sense if the water control valve has successfully reversed and returned to the open mode or the closed mode; if yes, it is judged that the stuck state is eliminated; if not, it is judged that the stuck state is not eliminated;

(E) a repeated reverse step: based on the judgment by the detecting and computing module in the reverse state sensing step repeat the previous Steps (C) to (D) till set repetition times; and (F) an automatic shutdown step: counting the repeated reverse of the water control valve in the previous Step (E) until the count reaches the set repetition times, and based on the judgment by the detecting and computing module in the reverse state sensing step the electronically controlled processing unit shuts down the water spraying timer and the operation is stopped.

2. The sticking elimination method for the water control valve of a water spraying timer of claim 1, wherein, in the open/closed state sensing step, the method to detect and sense the mode of the water control valve is realized through a configuration of a sensor.

3. The sticking elimination method for the water control valve of a water spraying timer of claim 2, wherein the set abnormal current value mentioned in the stuck state judging step is 2 times a normal current value, and the set abnormal time interval value is 3 seconds.

4. The sticking elimination method for the water control valve of a water spraying timer of claim 3, wherein the set repetition times mentioned in the repeated reverse step are 3 to 5 times.

5. The sticking elimination method for the water control valve of a water spraying timer of claim 1, wherein, in the automatic shutdown step, once the electronically controlled processing unit shuts down the water spraying timer and the operation is stopped, an alarming action is executed at the same time; the alarming action comprising: a flashing light, a buzzer to emit an alarming sound, and a wireless signal transmission to a remote management device.

6. A sticking elimination structure for a water control valve of a water spraying timer, said water spraying timer comprising: a power supply unit, a water control valve having an open mode and a closed mode and operating in the form of rotation, a driving motor, a gearbox to connect the driving motor with the water control valve, a setting interface, and an electronically controlled processing unit that is electrically connected to the setting interface and the driving motor, sticking elimination structure comprises:

an open/closed state sensing component, including an open state sensor and a closed state sensor, respectively used to detect and sense if the water control valve is in the open mode or in the closed mode, and to generate an open mode signal or a closed mode signal and send the signal to the electronically controlled processing unit;

a detecting and computing module, built inside the electronically controlled processing unit, to detect and judge if the water control valve is in a stuck state; in particular, when it is judged that the water control valve is in the stuck state, the detecting and computing module will order the driving motor to rotate inversely, so that the water control valve will simultaneously rotate inversely; and the detecting and computing module will once again detect if the water control valve has successfully reversed and returned to the open mode or the closed mode; if yes, it is judged that the stuck state is eliminated; if not, it is judged that the stuck state is not eliminated, and the driving motor is ordered to continue rotating inversely until a set repetition times; if the repetition times are reached, and the detecting and computing module still judges that the water control valve is in the stuck state, the electronically controlled processing unit will shut down the water spraying timer and the operation is stopped.

7. The sticking elimination structure for the water control valve of a water spraying timer of claim 6, wherein, one end of the water control valve is configured with a flange; the flange has a first corner position and a second corner position, which, along with the rotation of the water control valve, respectively corresponds to the open mode and closed mode of the water control valve; the open state sensor and closed state sensor of the open/closed state sensing component are realized by micro switches, and the open state sensor is configured at a place corresponding to the first corner position of the flange, whereas the closed state sensor is configured at a place corresponding to the second corner position of the flange.

8. The sticking elimination structure for the water control valve of a water spraying timer of claim 6, wherein the structure of the water spraying timer has an alarming device, said alarming device is in any of the following forms: a light, a buzzer, or a wireless signal transmission device.

* * * * *